US 12,122,292 B2

(12) United States Patent
Hupfer

(10) Patent No.: US 12,122,292 B2
(45) Date of Patent: Oct. 22, 2024

(54) COMMUNICATION LIGHT DEVICE FOR A VEHICLE INTERIOR, AND MOTOR VEHICLE HAVING A COMMUNICATION LIGHT DEVICE

(71) Applicant: AUDI AG, Ingolstadt (DE)

(72) Inventor: Philip Hupfer, Burgthann (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/555,461

(22) PCT Filed: Mar. 4, 2022

(86) PCT No.: PCT/EP2022/055514
§ 371 (c)(1),
(2) Date: Oct. 13, 2023

(87) PCT Pub. No.: WO2022/218602
PCT Pub. Date: Oct. 20, 2022

(65) Prior Publication Data
US 2024/0198900 A1 Jun. 20, 2024

(30) Foreign Application Priority Data
Apr. 16, 2021 (DE) ............ 10 2021 109 574.3

(51) Int. Cl.
*B60Q 3/78* (2017.01)
*B60Q 3/208* (2017.01)
(Continued)

(52) U.S. Cl.
CPC .............. *B60Q 3/78* (2017.02); *B60Q 3/208* (2017.02); *F21V 3/0625* (2018.02); *F21V 7/043* (2013.01);
(Continued)

(58) Field of Classification Search
CPC ......... F21V 14/08; F21V 11/06; F21V 11/065
See application file for complete search history.

(56) References Cited

U.S. PATENT DOCUMENTS

| 11,433,807 B2 | 9/2022 | Le Corre et al. |
| 2003/0164666 A1* | 9/2003 | Crunk ................. F21S 43/14 313/113 |

(Continued)

FOREIGN PATENT DOCUMENTS

| DE | 102015117658 A1 | 4/2016 |
| DE | 102016118717 A1 | 4/2018 |

(Continued)

OTHER PUBLICATIONS

International Search Report and Written Opinion of the International Searching Authority directed to related International Patent Application No. PCT/EP2022/055514, mailed May 19, 2022, with attached English-language translation; 23 pages.

*Primary Examiner* — Eric T Eide
(74) *Attorney, Agent, or Firm* — Sterne, Kessler, Goldstein & Fox P.L.L.C.

(57) ABSTRACT

The present disclosure relates to a communication light device for a vehicle interior, having a housing, wherein light sources are arranged in a row on a housing base, wherein the light sources are configured to generate a time-controllable light signal, wherein a side wall of the housing has a light exit opening which extends across the side wall in the direction of the row of light sources and which points towards the vehicle interior when the communication light device is in an intended installation position, and wherein internal walls of the housing have a diffusely reflecting surface.

11 Claims, 2 Drawing Sheets

(51) Int. Cl.
  *F21V 3/06*    (2018.01)
  *F21V 7/04*    (2006.01)
  *F21V 7/24*    (2018.01)
  *F21V 14/08*   (2006.01)
  *F21W 106/00*  (2018.01)
  *F21Y 103/10*  (2016.01)
  *F21Y 115/10*  (2016.01)

(52) U.S. Cl.
  CPC ............... *F21V 7/24* (2018.02); *F21V 14/08* (2013.01); *F21W 2106/00* (2018.01); *F21Y 2103/10* (2016.08); *F21Y 2115/10* (2016.08)

(56) References Cited

U.S. PATENT DOCUMENTS

| | | |
|---|---|---|
| 2011/0317442 A1 | 12/2011 | Makiuchi et al. |
| 2019/0225140 A1 | 7/2019 | Muegge |
| 2020/0116503 A1* | 4/2020 | Salter .................. G01C 21/343 |
| 2022/0017009 A1 | 1/2022 | Kaup et al. |

FOREIGN PATENT DOCUMENTS

| | | |
|---|---|---|
| DE | 102017222174 A1 | 10/2018 |
| DE | 102017213016 A1 | 1/2019 |
| DE | 202017106281 U1 | 2/2019 |
| DE | 102019108312 A1 | 10/2020 |
| FR | 3005717 A1 | 11/2014 |
| FR | 3086732 A1 | 4/2020 |
| JP | 2013246930 A | 12/2013 |
| JP | 2016060313 A | 4/2016 |
| WO | WO 2015/012771 A1 | 1/2015 |
| WO | WO 2018/194585 A1 | 10/2018 |

* cited by examiner

COMMUNICATION LIGHT DEVICE FOR A VEHICLE INTERIOR, AND MOTOR VEHICLE HAVING A COMMUNICATION LIGHT DEVICE

TECHNICAL FIELD

The present disclosure relates to a communication light device for a vehicle interior and to a motor vehicle having such a communication light device.

BACKGROUND

It is known that in a motor vehicle, interior lighting or ambient lighting can be provided which illuminates a vehicle interior and/or can generate an individual atmosphere in the vehicle interior. Recent concepts provide for using light systems as communication light ("interior communication light") which can provide light signals for a driver via a suitable control in order to enable communication and thereby provide information to the driver. For example, different colors and time-controllable light signals can be used to support the driver by visually displaying functions and warnings of the motor vehicle. Such a communication light device can be provided, for example, as an elongated light strip in the motor vehicle and signal to the driver a travel readiness as well as the unlocking and locking of the car. In addition, it is possible to highlight information from assistance and navigation systems and to announce braking requests as well as incoming telephone calls. Furthermore, the communication light device can be designed as a running light by timed control and accordingly indicate, for example, a direction in which a lane change is recommended. It can also be used to warn if the motor vehicle is in the wrong lane or if another vehicle is in a blind spot. Overall, a communication light device can accordingly improve driving safety and comfort during travel.

DE 10 2019 108 312 A1 discloses a communication light device for vehicles having a number of light sources with an elongated optical unit for generating a light signature, having a control unit for controlling the number of light sources so that a longitudinal extension of the elongated optical unit generates a light emission and/or luminous surface that can be varied in terms of location and/or time, wherein the communication light device is designed as a body component which is arranged on an outer side of the vehicle body and extends in the horizontal direction completely along a front side and/or completely along a rear side of the vehicle and/or completely or partially along a longitudinal side of the vehicle.

A lighting device for vehicles with a number of light sources, which are arranged in a row at a distance from one another along a distributor direction, is known from DE 10 2016 118 717 A1, having an elongated light guide element arranged in front of the light sources in the main emission direction and extends in one piece along a longitudinal direction running parallel to the distribution direction, wherein the light guide element has a light entry surface on a side facing the light sources and a light exit surface on a side facing away from the light sources, wherein the light exit surface has a lens-shaped contour, wherein the light guide element is designed as an elongated lens, wherein at least one base side of the light emitting surface extends continuously from a first end face of the elongated lens to a second end face thereof, and wherein the first end face of the elongated lens is arranged in the region of a first end face light source of the row of light sources and the second end face of the elongated lens is arranged in the region of a second end face light source of the same row of light sources.

A lighting device for an interior of a motor vehicle is known from DE 10 2017 222 174 A1. This has a plurality of light sources and at least one transparent or at least translucent body. Generated light beams of the light sources pass into a body and can exit therefrom in the direction of the interior. The light sources are arranged in a cavity and at a distance from the body. The cavity is surrounded by at least one interior trim part. A slit-like opening is left exposed due to the at least one interior trim part, such that the light sources are arranged along the opening and are not directly visible through the opening. Light beams generated by the light sources are initially diffusely reflected in the cavity and then enter the body. The light beams emerging from the body exit the body in the region of the opening.

From DE 20 2017 106 281 U1, a light guide arrangement of several plate-shaped light guides made of a solid transparent material and arranged sequentially is known.

The problem with communication light devices for vehicle interiors is that there is frequently little space available in the vehicle interior, which makes it difficult to mix the light of the individual light sources in order to achieve uniform brightness and/or a suitable color mixture. The concepts presented above are primarily designed for the outside of the vehicle body and are therefore often unsuitable for the vehicle interior, since they take up too much space.

BRIEF DESCRIPTION OF DRAWINGS/FIGURES

In the following, exemplary embodiments of the present disclosure are described in the figures.

DETAILED DESCRIPTION

Figure 1:
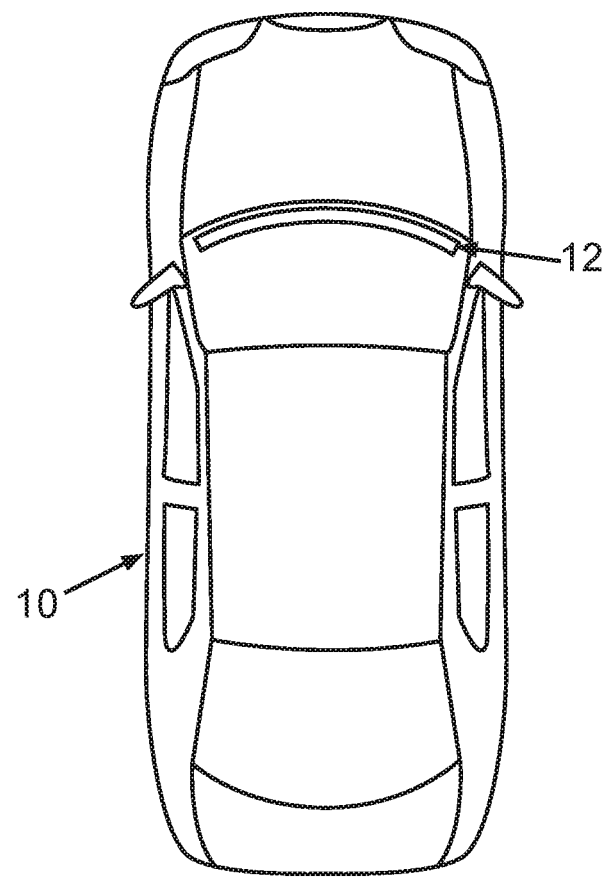
FIG. 1 shows a schematic diagram of a motor vehicle with a communication light device according to an exemplary embodiment.

The object of the present disclosure is to provide an improved communication light device for a vehicle interior, in particular with regard to space requirements and a light mixture.

This object is achieved by the independent claims. Advantageous developments of the present disclosure are disclosed by the dependent claims, the following description, and the figures.

The present disclosure is based on the awareness that current concepts are not suitable for very small installation spaces. The use of light guides which transport the light to the desired location is also disadvantageous, since additional welding or latching in the interior is required. The idea is to achieve a light mixture from light sources through a housing, in particular an upper housing part, which is produced from a reflective material and has a light exit opening in which the light can exit into the vehicle interior.

The present disclosure provides a communication light device for a vehicle interior, with a housing, wherein light sources are arranged in a row on a housing base, wherein the light sources are designed to generate a time-controllable light signal, wherein a side wall of the housing has a light exit opening which extends across the side wall in the direction of the row of light sources and which points towards the vehicle interior when the communication light device is in an intended installation position, and wherein internal walls of the housing have a diffusely reflecting surface.

In other words, a plurality of light sources are arranged in a row in a housing of the communication light device, in particular on a housing base of the housing. These light sources can generate a time-controllable light signal, which means that they can be designed, for example, to flash or as a running light. Inside the housing, inner walls have a diffusely reflecting surface so that a light signal from the light sources can be diffusely scattered, and transitions between the light signals of the individual light sources therefore become more uniform, i.e. a light mixture occurs. It can accordingly be achieved that the light exiting the communication light device has a more uniform transition between the respective light sources, and no visible boundaries occur. For emission into the vehicle interior, the housing can have a light exit opening in a side wall which can extend parallel to the row of light sources. In particular, the light exit opening can be elongated so that the light exit opening is formed like a light strip via which the light can be emitted from the housing of the communication light device into the interior. Preferably, the communication light device can be arranged in the vehicle interior within a field of vision of the driver, for example on a pane root of the windshield or on a dashboard of the motor vehicle.

For example, incandescent lamps, halogen lamps, fluorescent lamps, gas discharge tubes and/or LEDs can be used as the light source. A material or paint that reflects a substantial portion of the light signal can be used as a diffusely reflecting surface, wherein preferably directional reflection does not occur as with a mirror, but multiple scattering centers are provided which scatter the light uniformly in all spatial directions. A remission of the light signal therefore takes place through the surface in the housing.

It is also provided that baffles are arranged between the respective light sources, wherein the baffles are designed to influence crosstalk of the light signals between the light sources depending on their height. For example, crosstalk of the light signal can be reduced when there are raised baffles between the light sources which thereby enables sharper boundaries of the light to be achieved. With low baffles, the light signals from several light sources arranged next to each other can be superimposed, which results in smoother transitions and improved color mixing. It is preferably provided that the baffles are designed to variably change height. For example, electric motors can be provided, which can move the baffles upwards and downwards. The baffles can be provided, for example, as slats which are designed to be movable. This results in the advantage that a light mixture of the light signals can be adjusted in a manufacturing process of the communication light device by means of the height of the baffles. Alternatively, the baffles can also be designed to be movable, which results in the advantage that the crosstalk of the light signals can be variably adjusted during operation of the communication light device.

The present disclosure results in the advantage that a communication light device with an improved light mixture and accordingly with a more uniform brightness can be provided. Furthermore, an installation space requirement of the communication light device can be reduced, since light mixing is not carried out in a complicated manner via light guides, but can be provided by the housing itself. An assembly effort can also be reduced since light guides do not have to be used, which also reduces costs during production.

The present disclosure also comprises embodiments which result in additional advantages.

One embodiment provides that an inner wall of the housing opposite the light sources is arranged essentially obliquely in order to reflect the light signal in the direction of the light exit opening. In other words, the inner wall opposite the light sources can have an inclination, in particular an identical inclination to a windshield, so that the communication light device can be arranged in a particularly space-saving manner in the vehicle interior. It is preferably provided that the opposite inner wall is inclined in such a way that a surface normal points at least partially in the direction of the side wall of the housing in which the light exit opening is arranged. Light beams from the light sources can accordingly be scattered substantially in the direction of the light exit opening. In the simplest case, the housing of the communication light device can be designed as a triangle, in particular as a right-angled triangle, wherein in this case, for example, the light exit opening can be arranged on one cathetus and the light sources can be arranged on the opposing cathetus, wherein the inclined inner wall can be provided as a hypotenuse. However, further geometric cross-sectional shapes can also be provided for the communication light device. This embodiment affords the advantage that the brightness of the light signals exiting the light exit opening can be increased overall. Furthermore, the communication light device can be provided in a particularly space-saving manner, in particular for an arrangement on a pane root of the windshield of the motor vehicle.

Another embodiment provides that a diffuser is arranged on or in the light exit opening. The diffuser can preferably extend over the entire light exit opening. The diffuser can in particular be a diffusing disk made of a plastic or of quartz glass. This embodiment affords the advantage that a light mixture can be further improved, and a softer light signal can be generated.

Another embodiment provides that the light sources are designed as light-emitting diodes. This has the advantage that the light sources are particularly space-saving and have only a low power consumption. It is preferably provided that the light sources are designed to generate a color-controllable light signal. Accordingly, various intuitive colors can be displayed for the driver of the motor vehicle in order to provide communication. For example, a full battery can be shown with a green color, while a warning, for example for displaying a braking maneuver, can be shown in red. Particularly preferably, colored light-emitting diodes can be used which can be arranged on a chip and which are designed to generate a light color in the visible color spectrum. In particular, it can be provided that individual red, green and blue light-emitting diodes are arranged next to each other and/or one behind the other, wherein these are preferably individually controllable and therefore, depending on the intensity control of the red, green and/or blue light-emitting diode, an even more precise color composition can be achieved.

The light sources can advantageously be arranged both next to one another and one behind the other in the row. This means that the light sources are designed, for example, in a double row or a multiple row in the communication light device on the housing base. In particular, the colors of light sources located next to each other or behind each other can vary in order to achieve a particularly suitable light mixture.

An additional embodiment provides that the diffusely reflecting surface has a white surface and/or a layer vapor-deposited with aluminum. In particular, the inner wall of the housing can be made from a plastic, for example polycarbonate or polyamide and white scattering particles. In particular, the inner walls of the housing can be designed to be completely white, which results in the advantage that a particularly cost-effective diffusely reflecting surface can be achieved. Alternatively or additionally, the inner walls can be designed as a layer which is vapor-deposited with aluminum, which results in improved reflection properties.

An additional embodiment provides that the diffusely reflecting surface has additional geometric structures, in particular cushions and/or rollers. The geometric structures can be designed to additionally scatter the light, in particular depending on the particular geometry of the structures. For example, knobs, cushions and/or rollers can be provided as geometric structures. This results in the advantage that improved diffusion of the light signal can be achieved.

It is preferably provided that the diffusely reflecting surface is uneven, in particular has a grain. In other words, the diffusely reflecting surface can have a predetermined surface geometry, in particular a rough surface. A plurality of scattering centers can accordingly be provided at which the light can be scattered diffusely. For example, the surface can be vapor-deposited with a material, in particular a reflective material, to provide a grain. An improved diffusion of the light signal can accordingly be achieved.

An additional aspect of the present disclosure relates to a motor vehicle having a communication light device according to any one of the preceding embodiments. This results in the same advantages and variation options as with the communication light device. The motor vehicle according to the present disclosure is preferably designed as an automobile, in particular as a passenger car or a truck, or as a passenger bus or a motorcycle.

In one embodiment of the motor vehicle, it is provided that the communication light device is arranged on a windshield root. Accordingly, the communication light device can be provided in a field of vision of a driver of the motor vehicle. To arrange the communication light device on the windshield root, the inner wall of the housing opposite the light sources can be arranged essentially parallel to the windshield. A height of the side wall in which the light exit opening is arranged can preferably be specified in such a way that a region of the pane root, on which a projection device of a head-up display is usually arranged, is shielded from light beams, in particular from the sun. This has the advantage that the communication light device can interact in combination with a head-up display, and reflections by sunlight onto the head-up display can be blocked by means of the height of the side wall.

The present disclosure also includes developments of the motor vehicle according to the present disclosure, which developments have features such as have already been described in connection with the developments of the communication light device according to the present disclosure. For this reason, the corresponding developments of the motor vehicle according to the present disclosure are not described again here.

The present disclosure also comprises the combinations of the features of the described embodiments. The present disclosure therefore also comprises implementations which each have a combination of the features of several of the described embodiments, provided the embodiments have not been described as mutually exclusive.

The exemplary embodiments described below are preferred embodiments of the present disclosure. In the exemplary embodiments, the described components of the embodiments each represent individual features of the present disclosure that are to be considered independently of one another, each also further developing the present disclosure independently of one another. For this reason, the disclosure is also intended to include other combinations of the features of the embodiments than those described. Additionally, the described embodiments can also be complemented by additional, already described features of the present disclosure.

In the figures, the same reference signs refer to functionally identical elements.

FIG. 1 shows a plan view of a schematically illustrated motor vehicle 10 with a communication light device 12 according to an exemplary embodiment. The motor vehicle 10 can be designed, for example, as a passenger car, in particular as an electrically operated passenger car, and have the communication light device 12 within a field of vision of a driver of the motor vehicle 10. Preferably, the communication light device 12 can be arranged on a windshield root and display information and/or warnings to a driver of the motor vehicle 10 by means of light signals. The communication light device 12 can preferably extend elongated over the width of the vehicle and provide different information via a light signal that can be varied in color and/or duration. For example, a yellow running light can be provided from left to right or vice versa to indicate a lane change to the driver. For example, dangerous situations which can be detected in particular by a driver assistance system (not shown) can also be provided via the communication light device 12, for example via the display of a red light.

The arrangement of the communication light device 12 in the motor vehicle 10, in particular on the windshield root, results in the difficulty that only a small space is available for the communication light device 12. In particular, a light mixture to provide a more homogeneous light signal is more difficult due to the small installation space.

Figure 2:
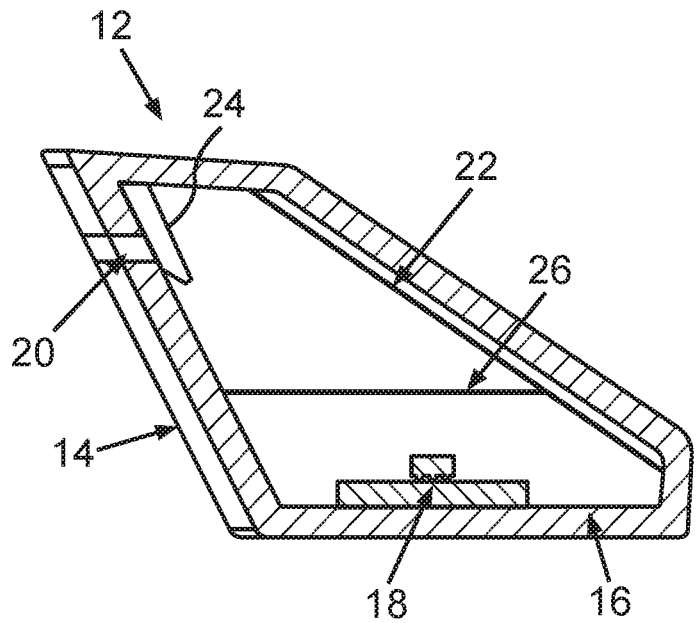
FIG. 2 shows a side cross-sectional view through a communication light device according to an exemplary embodiment.

For this reason, it has proven advantageous to provide a communication light device 12 as shown in accordance with an exemplary embodiment in a lateral cross-sectional view in FIG. 2. The communication light device 12 can have a housing 14, wherein light sources 18 are arranged in a row within the housing 14 on a housing base 16, wherein the row of light sources 18 extends into the image plane in this view. The light sources 18 can preferably be designed as light-emitting diodes which generate a color-controllable light signal. For this purpose, a plurality of light-emitting diodes with red, green and blue colors can be arranged on a chip, for example, which can display a plurality of colors by suitable control.

A light exit opening 20 can be arranged on a side wall of the housing 14, and extends longitudinally in the direction of the row of light sources 18 (into the image plane) across the housing 14 of the communication light device 12. An inner wall 22 of the housing 14 opposite the light sources 18 can preferably be arranged substantially obliquely so that a light signal can be reflected by the light sources 18 essentially in the direction of the light exit opening 20. Preferably, an angle of inclination of the side wall of the housing 14 is formed here at the same angle of inclination as the windshield of the motor vehicle 10. Accordingly, the communication light device 12 can be arranged in a particularly space-saving manner in the motor vehicle 10 on the windshield root.

It is particularly preferably provided that inner walls of the housing, in particular the inner wall 22 opposite the light sources 18, have a diffusely reflecting surface which is designed in particular to scatter the light diffusely toward the light exit opening 20. For this purpose, the surface can have, for example, a rough layer which is vapor-deposited with aluminum. The aluminum particles can improve a reflective property and, by means of a grain size of the aluminum particles, a diffusion property of the inner walls.

To additionally increase a homogeneity of the light signal, a diffuser 24, in particular a diffusion disk, can be arranged within or at the light exit opening 20. The diffuser 24 can preferably extend over the entire area of the light exit opening 20 and accordingly, together with the diffusely reflecting surface, provide a homogeneous and soft light signal over the entire light exit opening.

Between the respective light sources 18, baffles 26 can be arranged, by means of which crosstalk of light signals of adjacent light sources 18 can be influenced. In particular, a height of the baffles 26 can influence how much the light signals of adjacent light sources mix. This is advantageous in particular when using different colored light sources 18, in order to adjust color transitions. This is further explained below with reference to FIG. 3.

Figure 3:
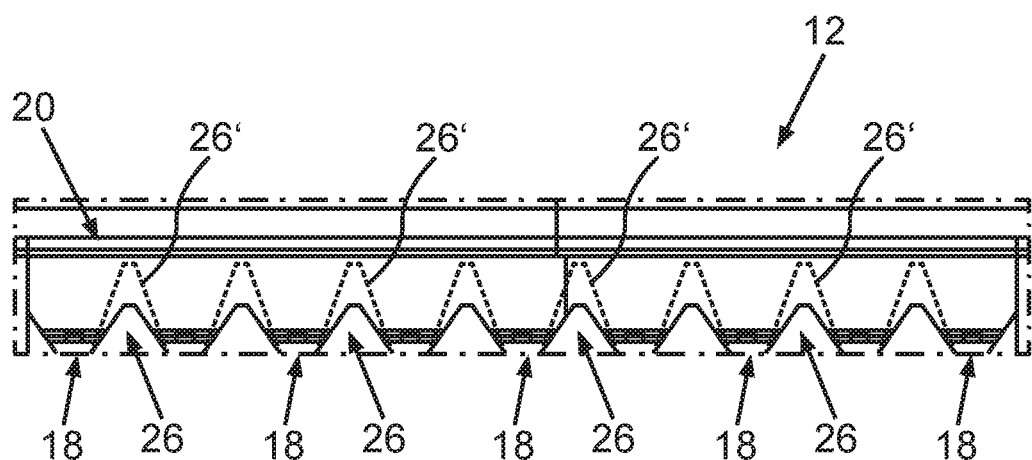
FIG. 3 shows a frontal cross-sectional view through a communication light device according to an exemplary embodiment.

FIG. 3 shows a communication light device 12 according to an exemplary embodiment in a frontal cross-sectional view. The frontal view can be the direction in which a driver looks at the communication light device 12 which is arranged in the windshield root. Here, the light sources 18 are shown in a row arranged next to one another, and the light exit opening 20 can point in the direction of the vehicle interior, in particular in the direction of a driver of the motor vehicle. Between the respective light sources 18, the baffles 26 can be arranged which are formed, for example, as truncated pyramids.

A tip of the baffles 26 can preferably be designed blunt or rounded. This means that they preferably do not have any sharp or hard edges, whereby artifacts in the light mixture between adjacent light sources 18 can be reduced. A height of the baffles 26 can influence the height of a crosstalk of the light signals between the adjacent light sources 18. With low baffles 26, more crosstalk can occur, whereby for example smooth color transitions can be achieved. If the baffles 26' are designed higher, in particular just below the light exit opening 20, crosstalk of the light signals can be reduced, whereby sharper boundaries of the light signals of the individual light sources 18 can be achieved. Accordingly, for example, sharper color transitions can be provided.

The height of the baffles 26, 26' can be predetermined, for example, in a manufacturing process; alternatively it can however also be provided that the baffles are designed to be variably movable, and crosstalk or a mixing of the light signals can be accordingly controlled. For this purpose, the baffles 26 can be designed, for example, as slats, which can be moved out or in between the light sources 18 via electric motors (not shown). Accordingly, intentional crosstalk of the light signals can be influenced and controlled by a baffle height.

Overall, the examples show how the present disclosure can provide an illumination device in the vehicle interior.

The invention claimed is:

1. A communication light device for a vehicle interior comprising:
   a housing with a housing base;
   a row of a plurality of light sources arranged on the housing base, wherein the plurality of light sources are configured to generate a light signal that is time-controllable;
   a light exit opening on a sidewall of the housing,
      wherein the light exit opening extends across the sidewall of the housing in a direction of a row of the plurality of light sources, and points towards the vehicle interior when the communication light device is in an intended installation position, and
      wherein an internal wall of the housing is configured to have a diffusely reflecting surface; and
   a plurality of baffles arranged between the plurality of light sources, the baffles being configured to:
   variably change their height; and
   influence crosstalk of the time-controllable light signals between the plurality of light sources as a function of their height.

2. The communication light device of claim 1, wherein the inner wall of the housing opposite the plurality of light sources is arranged substantially obliquely to reflect the light signal towards the light exit opening.

3. The communication light device of claim 1, further comprising a diffuser arranged on or in the light exit opening.

4. The communication light device of claim 1, wherein the plurality of light sources are light-emitting diodes.

5. The communication light device of claim 1, wherein the plurality of light sources are arranged next to one another and one behind another in the row of plurality of light sources.

6. The communication light device of claim 1, wherein the plurality of light sources are configured to generate a color-controllable light signal.

7. The communication light device of claim 1, wherein the diffusely reflecting surface is configured to have at least one of a white surface, or a vapor deposited layer with aluminum.

8. The communication light device of claim 1, wherein the diffusely reflecting surface is configured to have additional geometric structures, the additional geometric structures being at least one of cushions or rollers.

9. The communication light device of claim 1, wherein the diffusely reflecting surface is uneven because of a grain in the diffusely reflecting surface.

10. A motor vehicle comprising a communication light device, the communication light device comprising:
    a housing with a housing base;
    a row of a plurality of light sources arranged on the housing base, wherein the plurality of light sources are configured to generate a light signal that is time-controllable;
    a light exit opening on a sidewall of the housing,
       wherein the light exit opening extends across the sidewall of the housing in a direction of a row of the plurality of light sources, and points towards the vehicle interior when the communication light device is in an intended installation position, and
       wherein an internal wall of the housing is configured to have a diffusely reflecting surface; and
    a plurality of baffles arranged between the plurality of light sources, the baffles being configured to:
    variably change their height; and
    influence crosstalk of the time-controllable light signals between the plurality of light sources as a function of their height.

11. The motor vehicle of claim 10, wherein the communication light device is configured to be arranged on a windshield root.

* * * * *